United States Patent
Sundaram et al.

(10) Patent No.: US 8,612,944 B2
(45) Date of Patent: Dec. 17, 2013

(54) CODE EVALUATION FOR IN-ORDER PROCESSING

(75) Inventors: Ramakrishnan Ganesh Sundaram, Hyderabad (IN); Rajiv B. Narayan, San Diego, CA (US); Satya Jayaraman, Hyderabad (IN); Ming Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 12/104,586

(22) Filed: Apr. 17, 2008

(65) Prior Publication Data

US 2009/0265531 A1    Oct. 22, 2009

(51) Int. Cl.
*G06F 15/00* (2006.01)
*G06F 15/76* (2006.01)

(52) U.S. Cl.
USPC .......................................... 717/136; 717/140

(58) Field of Classification Search
USPC .......................................................... 712/220
See application file for complete search history.

(56) References Cited

U.S. PATENT DOCUMENTS

| | | | |
|---|---|---|---|
| 5,053,986 A * | 10/1991 | Ahsan et al. | 708/520 |
| 5,850,552 A | 12/1998 | Odani et al. | |
| 5,860,018 A * | 1/1999 | Panwar | 712/23 |
| 5,878,244 A * | 3/1999 | Witt et al. | 712/218 |
| 5,983,342 A * | 11/1999 | Tran | 712/218 |
| 6,209,126 B1 | 3/2001 | Sasaki et al. | |
| 6,367,076 B1 | 4/2002 | Imai et al. | |
| 6,957,325 B1 | 10/2005 | Chang et al. | |
| 2004/0215940 A1 | 10/2004 | Heishi et al. | |
| 2005/0125786 A1 | 6/2005 | Dai et al. | |
| 2005/0228976 A1 | 10/2005 | Taylor | |
| 2006/0101251 A1 | 5/2006 | Nguyen et al. | |
| 2007/0198971 A1 | 8/2007 | Dasu et al. | |
| 2007/0239975 A1 | 10/2007 | Wang | |

FOREIGN PATENT DOCUMENTS

| | | |
|---|---|---|
| TW | 200617777 | 6/2006 |
| TW | 200739419 | 10/2007 |

OTHER PUBLICATIONS

International Search Report—PCT/US09/039143, International Search Authority—European Patent Office—Aug. 4, 2009.
Jaaskelainen P et al: "Resource Conflict Detection in Simulation of Function Unit Pipelines" Journal of Systems Architecture, Elsevier Science Publishers BV., Amsterdam, NL, vol. 54, No. 11, (Apr. 7, 2008), pp. 1058-1064, XP025471768.
Shrivastava A. et al: "Retargetable Pipeline Hazard Detection for Partially Bypassed Processor" IEEE Transactions on Very Large Scale Integration (VLSI) Systems IEEE USA, vol. 14, No. 8, (Aug. 2006), pp. 791-801, XP002537120.
Written Opinion—PCT/US09/039143, International Search Authority—European Patent Office—Aug. 4, 2009.

(Continued)

*Primary Examiner* — Corey S Faherty
(74) *Attorney, Agent, or Firm* — Nicholas J. Pauley; Peter Michael Kamarchik; Joseph Agusta

(57) ABSTRACT

Systems and methods of code evaluation for in-order processing are disclosed. In an embodiment, the method includes identifying a first instruction having multiple execution source paths. The method also includes generating a first execution path model identifying an execution order of multiple instructions based on a first condition and generating a second execution path model identifying an execution order of a second instruction based on a second condition. The method includes evaluating at least one of the execution path models to identify a hazard condition.

23 Claims, 7 Drawing Sheets

(56) References Cited

OTHER PUBLICATIONS

Zivojnovic V et al: "Lisa-Machine Description Language and Generic Machine Model for HW/ SW Co-Design" VSLI Signal Processing, IX, 1996., Workshop on San Franscisco, CA, USA Oct. 30-Nov. 1996, New York, NY, USA, IEEE, US, (Oct. 30, 1996), pp. 127-136, XP010199005.

Taiwan Search Report—TW098112210—TIPO—Jun. 27, 2012.

* cited by examiner

CODE EVALUATION FOR IN-ORDER PROCESSING

I. FIELD

The present disclosure is generally related to code evaluation for in-order processing.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application that can be used to access the Internet.

Developing computer programs to be processed at such portable personal computing devices may include writing code, assembling the code, testing the code, and correcting errors. In particular, for in-order processors that do not include special hardware to detect and resolve hazards, such as data dependency hazards, detection and resolution of such hazards is performed during the development and testing of the software. However, when the software code includes conditional branches, loops, and other non-sequential code, detecting and correcting hazards becomes increasingly difficult.

III. SUMMARY

In a particular embodiment, a method of evaluating program code for a pipeline execution processor with in-order execution is disclosed. The method includes identifying a first instruction having multiple execution source paths. The method also includes generating a first execution path model identifying an execution order of multiple instructions based on a first condition. The method further includes generating a second execution path model identifying an execution order of a second instruction based on a second condition. The first execution path model and the second execution path model each include the first instruction. The method further includes evaluating at least one of the execution path models to identify a hazard condition.

In another particular embodiment, the method includes receiving program code for the processor. The method also includes identifying a first execution queue that identifies an execution order of multiple instructions based on a first condition and identifying a second execution queue that identifies an execution order of a second instruction based on a second condition. The first execution queue and the second execution queue include at least one common instruction. The method further includes evaluating the first execution queue and the second execution queue to identify and report a hazard condition.

In another particular embodiment, a system that includes a memory to store program instructions for an in-order processor is disclosed. The system includes modeling means for determining at least two parallel execution path models of the program instructions based on at least one conditional branching instruction. The system includes evaluation means for identifying and reporting a hazard condition in at least one of the parallel execution path models.

In another particular embodiment, a processor readable medium including operational instructions that are executable by a processor is disclosed. The operational instructions include instructions to identify a conditional branch in a computer program written to be executed by an in-order processor. The operational instructions also include instructions to evaluate a first execution path based on a first condition of the conditional branch and to evaluate a second execution path based on a second condition of the conditional branch. The operational instructions further include instructions to report a hazard condition associated with either the first execution path or the second execution path.

Particular advantages provided by disclosed embodiments include improved speed for software development, a reduced occurrence of code hazards, and a shorter design cycle for programs to be executed by in-order processors.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
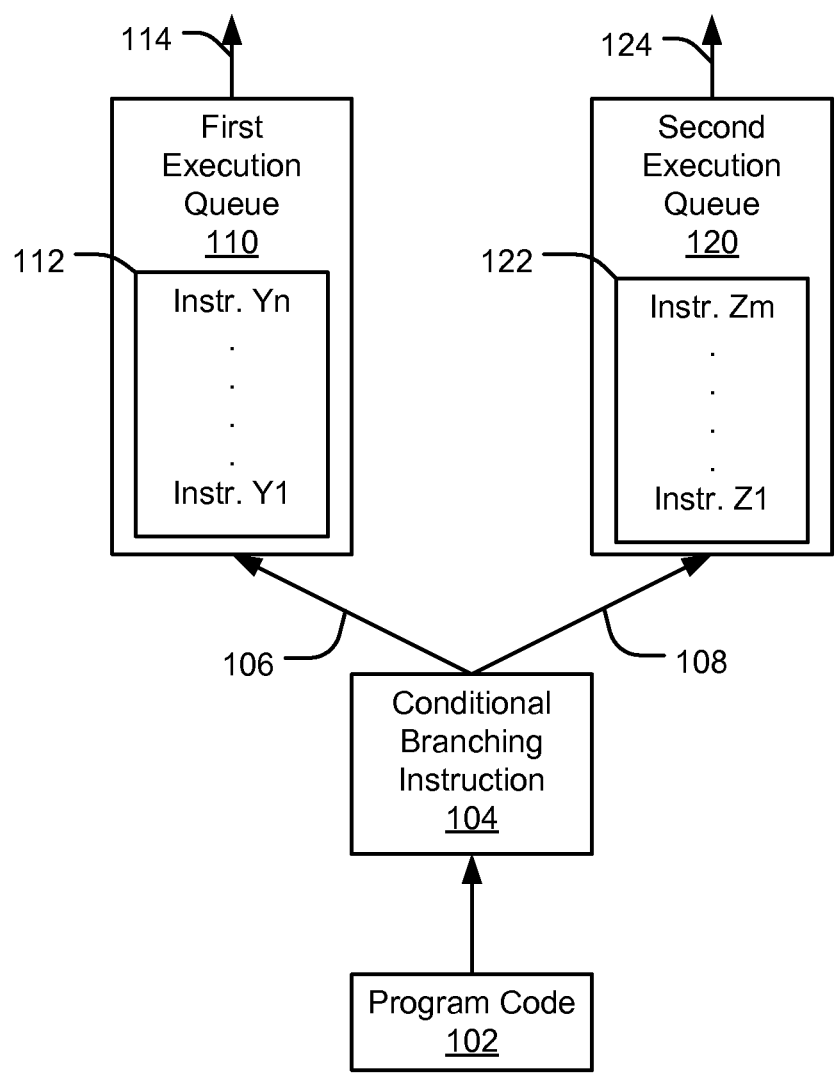
FIG. 1 is a general diagram of an embodiment of a code evaluation system.

Referring to FIG. 1, a particular illustrative embodiment of a code evaluation system is depicted and generally designated 100. The system 100 receives program code 102 including a conditional branching instruction 104. A first execution queue 110 identifies an execution order of a first set of instructions 112 designated Y1 . . . Yn, based on a first condition 106. A second execution queue 120 identifies an execution order of a second set of instructions 122 designated Z1 . . . Zn, based on a second condition 108. Program execution conditionally proceeds according to a first instruction order 114 following the first set of instructions 112 or according to a second instruction order 124 following the second set of instructions 122.

In a particular embodiment, the program code 102 includes instructions received at the system 100 for evaluation prior to execution at an in-order processor. The first instruction queue 110 and the second instruction queue 120 may be identified based on possible outcomes of the conditional branching instruction 104. For example, the conditional branching instruction 104 may include a conditional jump instruction to a particular target instruction. The first execution queue 110 may be populated with instructions 112 to be executed by the processor when the jump is not performed. The second execution queue 120 may be populated with instructions 122 to be executed by the processor when the jump is performed. In this illustrative example, the first execution queue 110 and the second execution queue 120 both include the jump target instruction. The system may evaluate both the first execution queue 110 and the second execution queue 120 to identify and report a hazard condition associated with either of the execution queues 110 and 120.

By evaluating multiple conditional execution queues 110 and 120, the system 100 allows program hazards to be detected along multiple execution flows at the processor. For example, conditional execution of instructions due to jumps, loops, and other program branching logic, as well as conditional or conditionally executed individual instructions, may mask data dependencies between executed instructions when such conditions are resolved at runtime.

Hazard conditions that may be detected at the system 100 include data dependency hazards, such as when a later instruction that uses a result generated by an earlier instruction is executed before the earlier instruction finishes writing the result to a target address or register. Pipeline resource hazards may also be detected, such as when two instructions executed at a pipelined processor both require access to the same hardware resource at the same time. Program flow hazards may also be detected, such as minimum execution distances between instructions that are not due to data dependencies.

In a particular embodiment, the system 100 may be implemented as circuitry at a processor to evaluate and detect potential hazards prior to execution at the processor. However, in another particular embodiment, the system 100 is part of an evaluation tool, such as used in conjunction with an assembler or a compiler. With the evaluation tool, software development cycle time may be improved, and development costs and time to market of new software may be reduced.

Figure 2:
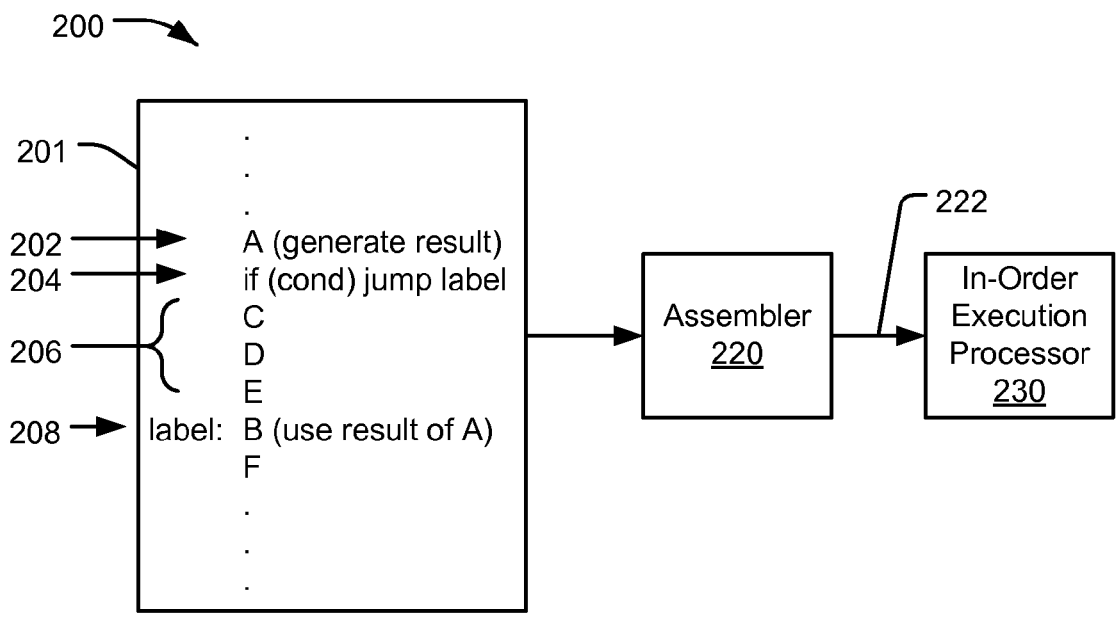
FIG. 2 is a block diagram of an embodiment of a system to evaluate code.

Referring to FIG. 2, a particular illustrative embodiment of a system to evaluate code is depicted and generally designated 200. The system 200 includes a representative file 201 including program code to be provided to an assembler 220. The output of the assembler 220, such as object code 222, is provided to an in-order execution processor 230. In a particular embodiment, the in-order execution processor 230 has an exposed pipeline, meaning that the processor 230 does not re-order instructions and does not insert stalls or bubbles into the pipeline to prevent dependency hazards between instructions.

The file 201 includes a first instruction A 202 that generates a result. A conditional jump instruction 204 causes program execution to jump to a target instruction B 208 when a condition evaluates to true and to continue executing sequential instructions C, D, and E 206 when the condition evaluates to false. The target instruction B 208 uses the result that was generated by instruction A 202, and after execution of instruction B 208, processing continues with instruction F.

The instructions 202-208 of the file 201 are to be understood as an illustrative portion of a software program that may include any number of lines of code with multiple conditional and branching instructions throughout. In addition, as will be explained in more detail with respect to FIG. 7, the file 201 may further include assembler information, such as pragma information, to enable the assembler 220 to evaluate program code contained in multiple source files.

Figure 3:
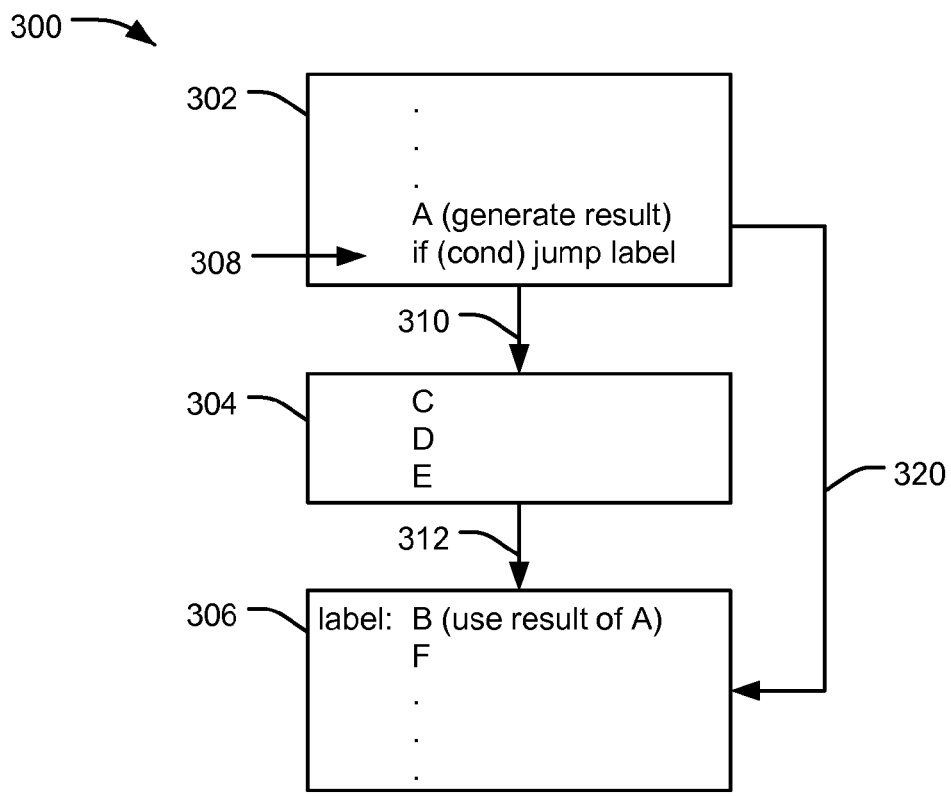
FIG. 3 is a general diagram of an embodiment of program code execution models.

Referring to FIG. 3, a particular illustrative embodiment of program code execution models is depicted and generally designated 300. A first execution path model includes a first logical block 302, a second logical block 304, and a third logical block 306, indicated by links 310 and 312. A second execution path model includes the first logical block 302 and the third logical block 306, indicated by a link 320. In an illustrative embodiment, the execution models may be generated by the assembler 220 operating on the instructions of the file 201 depicted in FIG. 2.

The first logical block 302 includes an instruction A that generates a result, followed by a conditional branch instruction 308, illustrated as a conditional jump. The second logical block 304 includes multiple instructions to be executed based on a first condition associated with the branch instruction 308. A third logical block 306 includes a target B of the branch instruction, which uses the result of instruction A.

In a particular embodiment, the logical blocks 302, 304, and 306 are generated to identify code segments that remain grouped when multiple data execution models are identified. The multiple data execution models may be generated based on conditions associated with multiple execution source paths of an instruction. For example, the instruction A and the conditional branch instruction 308, as well as the target B of the conditional branch instruction, are included in both the first execution path model and the second execution path model. The instructions C, D, and E in the second logical block 304 are conditionally executed based on the conditional branch instruction 308. Each of the execution path models may be evaluated to identify a hazard condition.

Figure 4:
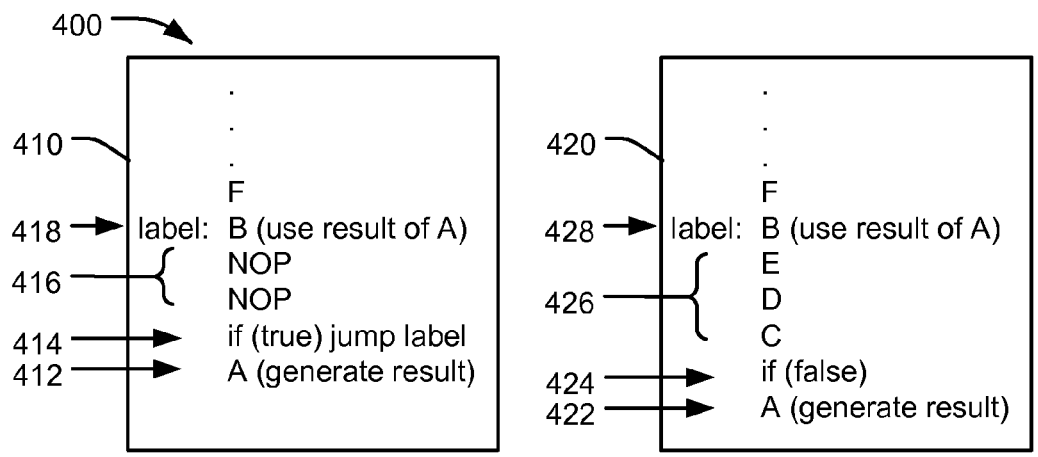
FIG. 4 is a general diagram of an embodiment of program code execution queues.

Referring to FIG. 4, a particular illustrative embodiment of program code execution queues is depicted and generally designated 400. A first execution queue 410 and a second execution queue 420 are identified in response to a conditional branching instruction, such as a loop instruction or a conditional jump instruction. In an illustrative embodiment, the first and second execution queues 410 and 420 may be constructed based on the execution path models illustrated in FIG. 3, for example, such as by the assembler 220 of FIG. 2.

The first execution queue 410 includes a first instruction A 412 that generates a result. The instruction A 412 is followed by a conditional jump instruction 414 (note the instruction order is from bottom to top of the queue), where the condition is evaluated as true so that the jump is taken to a target instruction B 418. The target instruction B 418 uses the result generated by A 412. In addition, two "no-operation" (NOP) instructions 416 have been included between the conditional jump instruction 414 and the target instruction B 418 to reflect a condition where a jump instruction requires three execution cycles to complete at a processor.

The second execution queue 420 includes a first instruction A 422 that generates a result. The instruction A 422 is followed by a conditional instruction 424, where the condition is evaluated as false so that no execution branch is taken, as opposed to conditional instruction 414. Instructions C, D, and E 426 are included in the second execution queue 420 after the conditional instruction 424, followed by the target instruction B 428 of the conditional instruction 424.

As illustrated, the first execution queue 410 includes the first, second, and third logical blocks 302-306 depicted in FIG. 3, and the second execution queue 420 includes the first logical block 302 and the third logical block 306, but not the second logical block 304, depicted in FIG. 3.

Figure 5:
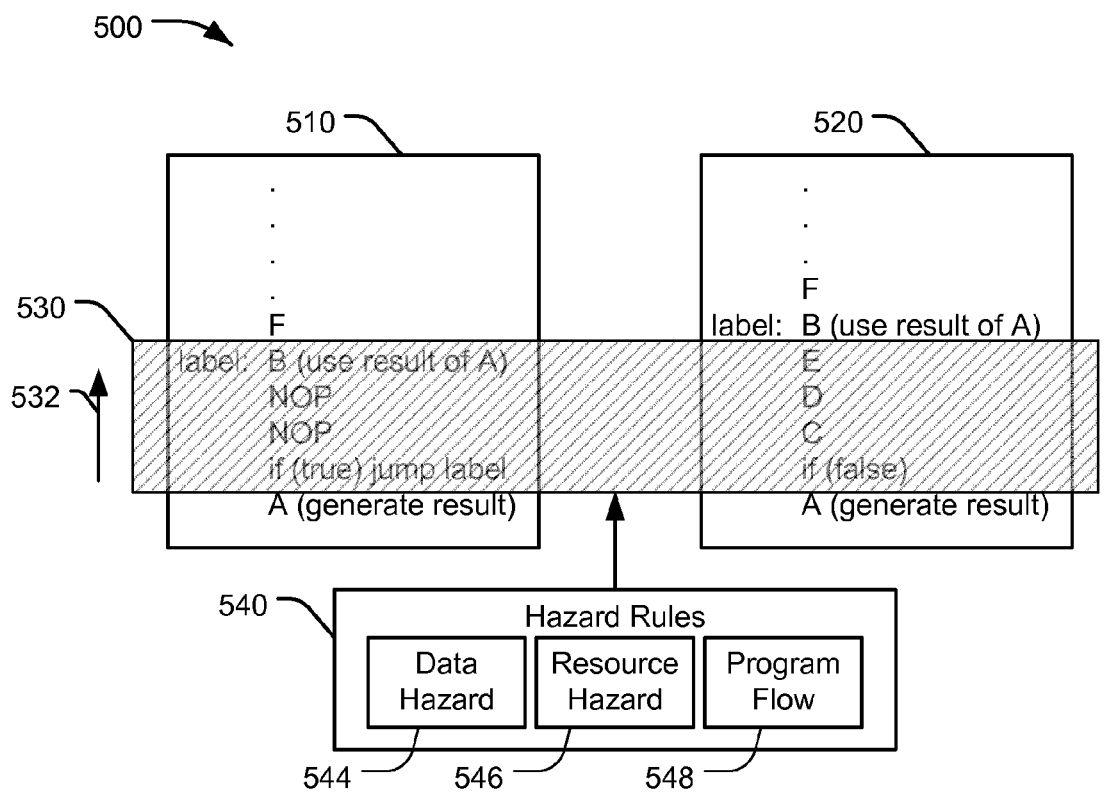
FIG. 5 is a general diagram of an embodiment of a sliding window to evaluate program code.

Referring to FIG. 5, a particular illustrative embodiment of a sliding window to evaluate program code is depicted and generally designated 500. A first execution queue 510 and a second execution queue 520 are evaluated via at least one sliding window 530. The sliding window 530 applies hazard rules 540 to instructions in the execution queues 510, 520 within the sliding window 530 as the sliding window 530 traverses the execution queues 510, 520 in the direction indicated by the arrow 532. In an illustrative embodiment, the execution queues 510 and 520 may be the execution queues 410 and 420 depicted in FIG. 4.

As illustrated, the first execution queue 510 includes instructions to be executed when a conditional jump instruction is taken, including no-operation (NOP) instructions to reflect a delay associated with performing the jump operation. The second execution queue 520 includes instructions to be executed when the conditional jump instruction is not taken. Both execution queues 510 and 520 include the jump target instruction B, which uses a result generated by an earlier instruction A.

In a particular embodiment, the sliding window 530 applies hazard rules 540 including data hazard rules 544, to each of the execution queues 510 and 520. The data hazard rules 544 may indicate a minimum distance or number of instruction cycles allowed between a first instruction generating a result and a second instruction using the result. In the example illustrated, a minimum distance of four instructions is embodied in a height of the sliding window 530.

For example, the instruction A may be evaluated in one or more of the execution queues 510 and 520. The sliding window 530 may be positioned to indicate instructions within the minimum distance of the instruction A, where such instructions would be unable to use a result generated by the instruction A. As illustrated, the jump target instruction B, which uses the result of the earlier instruction A, lies within the sliding window 530 in the first execution queue 510 (i.e., when the jump is taken) but not within the sliding window 530 in the second execution queue 520 (i.e., when the jump is not taken). Thus, a data hazard associated with instructions A and B when the jump is taken is detected and may be reported or corrected. The data hazard may have remained undetected if both conditional execution flows had not been evaluated and if instead the sliding window had been applied to the code as written.

In a particular embodiment, the sliding window 530 may also apply resource hazard rules 546 to determine potential or actual conflicts between different instructions requesting hardware resources. For example, the sliding window 530 may access a pipeline resource table, such as the pipeline resource utilization table 610 depicted in FIG. 6. In a particular embodiment, the sliding window 530 applies program flow hazard rules 548 to determine potential or actual occurrences where individual instructions are within one or more predetermined minimum distances of each other, other than for data dependencies.

In a particular embodiment, the sliding window 530 evaluates data hazards, resource hazards, program flow hazards, or any combination thereof. For example, the sliding window 530 may be configured to evaluate program flow via multiple passes through one or more of the execution queues, or may evaluate some but not necessarily all of the various hazard types. Although the sliding window 530 is depicted as evaluating both of the execution queues 510 and 520 in parallel, in other embodiments the sliding window 530 may not perform parallel evaluation of execution queues and may instead evaluate one or more execution queues sequentially or in any other order.

Further, although the sliding window 530 is depicted as sliding relative to the execution queues 510 and 520, in other embodiment the execution queues 510 and 520 may be applied to a "stationary" window, such as, for example, by feeding one or more execution queues 510 and 520 into one or more state machines or other circuits (not shown) configured to apply the hazard rules 540 as the instructions are received. In addition, although the sliding window 530 is depicted as having a height corresponding to a data hazard distance, the sliding window 530 may have a "height" or evaluation range not associated with data hazard distance. For example, when evaluating hazards for a pipelined processor that completes each instruction in six clock cycles, the sliding window 530 may have an evaluation range spanning six instructions, and may apply one or more "sub-windows," such as a six-instruction window for resource hazards, a four-instruction window for data hazards, and a two-instruction window for certain program flow hazards, as illustrative, non-limiting examples.

Figure 6:
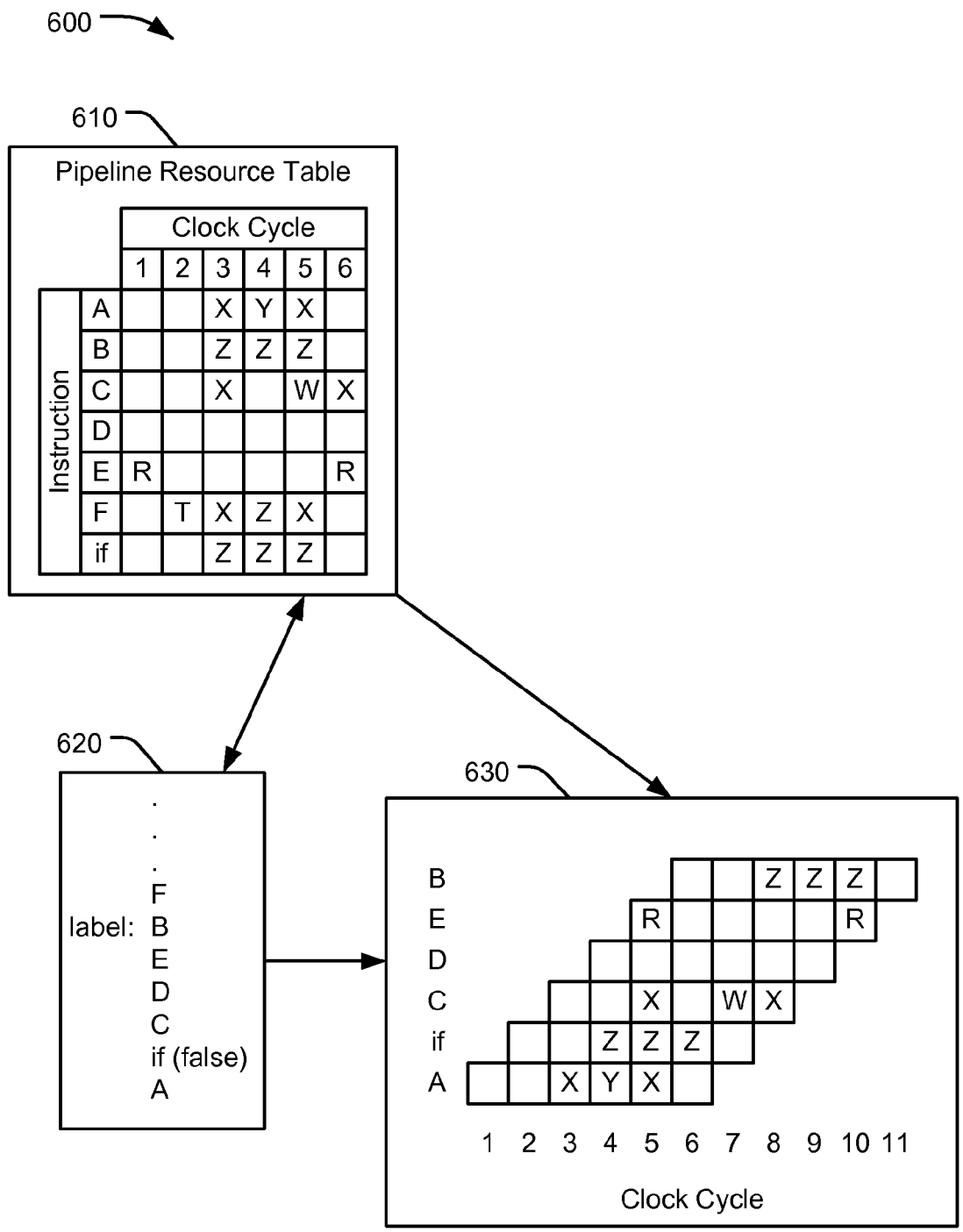
FIG. 6 is a general diagram of an embodiment of a pipeline resource hazard evaluation.

Referring to FIG. 6, a particular illustrative embodiment of a pipeline resource hazard evaluation is depicted and generally designated 600. A pipeline resource utilization table 610 is applied to an execution queue 620 to generate a resource hazard determination structure 630. In an illustrative embodiment, the pipeline resource utilization table 610 is accessible to the sliding window 530 depicted in FIG. 5 to evaluate resource hazards.

In a particular embodiment, the pipeline resource utilization table 610 includes static predefined resource information associated with one or more particular instructions. For example, the resource information associated with one or more instructions may not change dynamically. In a particular embodiment, the pipeline resource utilization table 610 includes dynamic resource information associated with one or more instructions. For example, the resources required for a particular instruction may change based on executing one or more other instructions. To illustrate, a prior instruction that loads a cache line that includes data used by a later instruction would circumvent loading the same cache line in the later instruction, and thus free the resources required to do so. Such dynamic resource information may be updated at the pipeline resource utilization table 610.

As illustrated, the pipeline resource utilization table 610 includes a table having rows associated with instructions and columns associated with clock cycles. Each table entry indicates one or more resources used by the associated instruction at the associated number of clock cycles after beginning execution of the instruction. For example, execution of instruction A requires using resource X at 3 clock cycles, resource Y at 4 clock cycles, and resource X at 5 clock cycles, from the beginning of execution of instruction A. As another example, execution of instruction D requires no resources. Examples of pipeline resources include caches, translation lookaside buffers, data or address busses, register files, other hardware resources, or any combination thereof.

In a particular embodiment, the resource hazard determination structure 630 may be dynamically generated as the execution queue 620 is evaluated. As each instruction of the execution queue 620 is evaluated, a current clock cycle of the resource hazard determination structure 630 is incremented, and the data associated with the instruction from the pipeline resource utilization table 610 is added. Hazards may be detected when a common resource is duplicated in a single column of the resource hazard determination structure 630.

For example, as illustrated, the instruction A begins at clock cycle 1 and uses resources X, Y, and X at clock cycles 3, 4, and 5, respectively. The "if" instruction begins at clock cycle 2 and uses resource Z at clock cycles 4, 5, and 6. Instruction C begins at clock cycle 3, and uses resources X, W, and X at clock cycles 5, 7, and 8, respectively. Thus, instructions A and C both use resource X at clock cycle 5, indicating a pipeline resource hazard.

Figure 7:
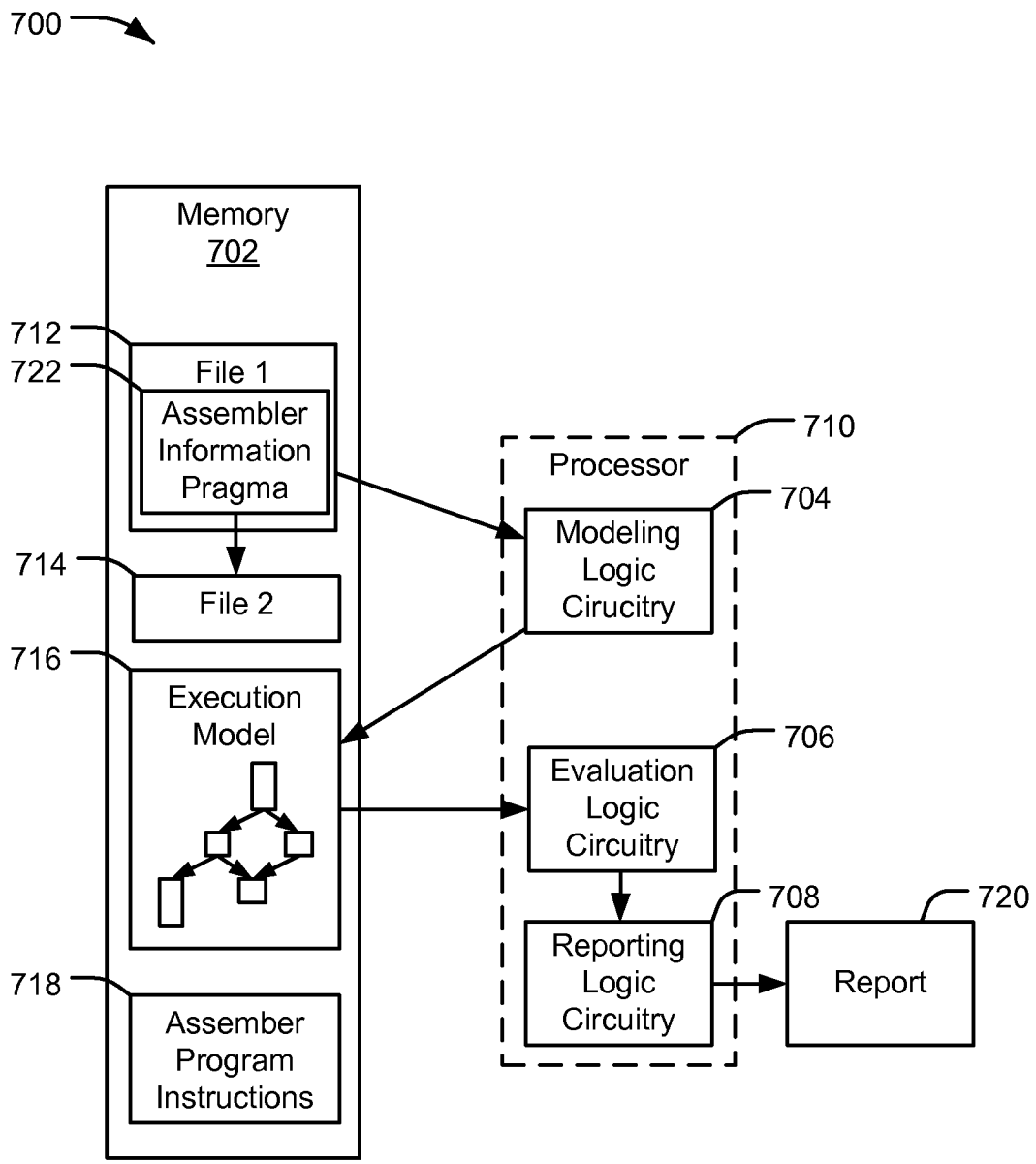
FIG. 7 is a block diagram of an embodiment of a system to evaluate program code.

Referring to FIG. 7, a particular illustrative embodiment of a system to evaluate program code is depicted and generally designated 700. The system 700 includes a memory 702 to store program instructions for an in-order processor (not shown). The memory 702 is coupled to modeling logic circuitry 704 and evaluation logic circuitry 706. The evaluation logic circuitry 706 is coupled to reporting logic circuitry 708, which is configured to generate a report 720.

In a particular embodiment, the modeling logic circuitry 704, the evaluation logic circuitry 706, the reporting logic circuitry 708, or any combination thereof, are part of a processor 710 that executes processor-readable program instructions from a processor-readable medium, such as the memory 702. For example, the memory 702 may be readable by the processor 710 and may have operational instructions that are executable by the processor 710. The operational instructions may include instructions to identify a conditional branch in a computer program written to be executed at an in-order processor, instructions to evaluate a first execution path based on a first condition of the conditional branch and to evaluate a second execution path based on a second condition of the conditional branch, and instructions to report a hazard condition associated with either of the first execution path and the second execution path. In a particular embodiment, at least one of the modeling logic circuitry 704 and the evaluation logic circuitry 706 is configured to generate or evaluate at least two parallel execution path models.

In a particular embodiment, the modeling logic circuitry 704 is configured to determine at least two parallel execution path models of program instructions based on at least one conditional branching instruction. In a particular embodiment, the modeling logic circuitry 704 is configured to receive a first portion of the program instructions stored at a first file 712 at the memory 702. The modeling logic circuitry 704 may also be configured to receive assembler assistance information 722 that is stored at the first file 712 and that is associated with a second portion of the program instructions stored at a second file 714 at the memory 702. The modeling logic circuitry 704 may be configured to generate execution model information 716 that includes at least two parallel execution path models, such as depicted in FIG. 3.

In a particular embodiment, the processor 710 executes assembler program instructions 718 to generate object code for program instructions written as modules at the first file 712, the second file 714, and optionally at one or more other files (not shown) in conjunction with generating the execution model information 716. Where the assembler program may be restricted in scope to evaluating the first file 712, the assembler assistance information 722 may enable the assembler to check inter-instruction dependencies and hazards between the first file 712 and the second file 714. In a particular embodiment, the assembler assistance information 722 includes assembler pragmas or directives defined to provide instruction data at the target of a program flow instruction to another file. For example, when a program flow instruction is encountered by the assembler at the first file 712, the assembler may attempt to resolve the program flow within the first file 712. If the assembler cannot resolve the program flow within the first file 712, the assembler may automatically search for the assembler assistance information 722, such as by locating one or more pragma definitions for the program flow target in the second file 714.

In a particular embodiment, the evaluation logic circuitry 706 is configured to identify a hazard condition in at least one of the parallel execution path models of the execution model information 716. In a particular embodiment, the evaluation logic circuitry 706 includes a portion of the processor 710 configured to populate a first instruction execution queue corresponding to a first of the parallel execution path models and a second instruction execution queue corresponding to a second of the parallel execution path models, such as the execution queues 410 and 420 depicted in FIG. 4.

In a particular embodiment, the evaluation logic circuitry 706 includes a portion of the processor 710 configured to evaluate multiple execution queues to detect at least one of a data dependency hazard, a resource hazard, and a program flow hazard. In an illustrative embodiment, the evaluation logic circuitry 706 is configured to generate and evaluate multiple execution queues using the sliding window 530 and associated hazard rules 540, as depicted in FIG. 5, using the pipeline resource hazard table 610 as depicted in FIG. 6, or any combination thereof.

In a particular embodiment, the reporting logic circuitry 708 is configured to report the hazard condition. For example, the reporting logic circuitry 708 may include a portion of the processor 710 configured to execute instructions to generate the report 720 to include line numbers and indicating an error and a reason for the error. Where one or more conditional branches across the multiple files 712 and 714 are evaluated, the report 720 may further identify an error associated with at least one instruction located at the first file 712, the second file 714, other files (not shown), or any combination thereof. In a particular embodiment, the report 720 indicates to insert instructions to delay execution of the computer program before jumping from executing instructions at the first file 712 to begin executing a first instruction at the second file 714.

Figure 8:
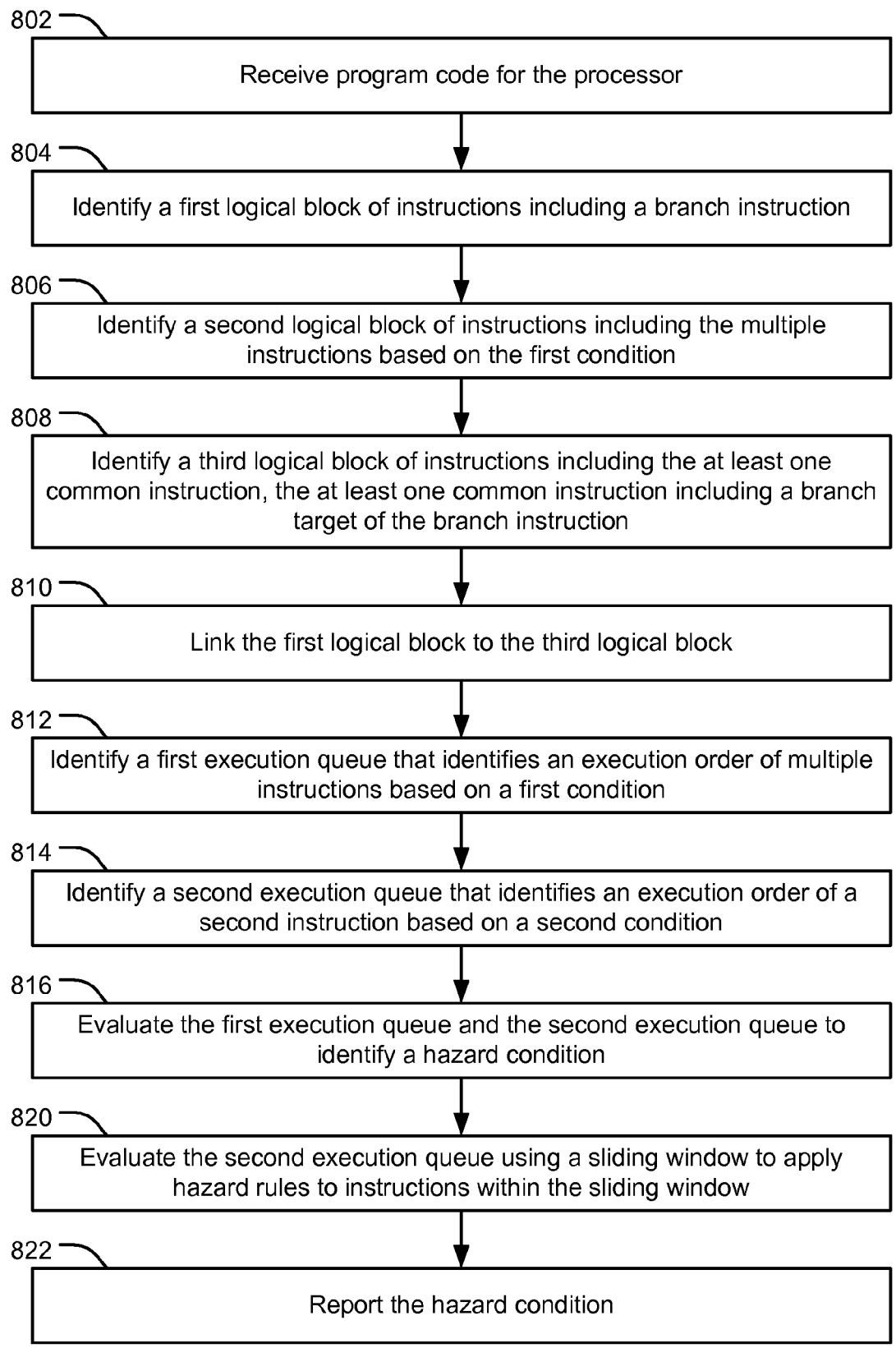
FIG. 8 is a flow chart of a first embodiment of a method to evaluate code.

Referring to FIG. 8, a flow chart of a first embodiment of a method to evaluate program code is depicted. In a particular embodiment, the program code is evaluated for a pipeline execution processor with in-order execution. In an illustrative embodiment, the method may be performed by the system 700 depicted in FIG. 7 in accordance with one or more of the embodiments depicted in FIGS. 1-6.

The method includes receiving program code for the processor, at 802. Advancing to 804, a first logical block of instructions including a branch instruction is identified. Continuing to 806, a second logical block of instructions including multiple instructions is identified based on the first condition. Proceeding to 808, a third logical block of instructions including at least one common instruction is identified, the at least one common instruction including a branch target of the branch instruction. Moving to 810, in a particular embodiment, the first logical block is linked to the third logical block.

Proceeding to 812, a first execution queue identifies an execution order of multiple instructions based on a first condition. Advancing to 814, a second execution queue identifies an execution order of a second instruction based on a second condition. For example, the first execution queue and the second execution queue may be identified in response to a loop instruction or conditional jump instruction. To illustrate, a loop instruction may indicate a conditional or non-conditional return to a prior instruction. In a particular embodiment, the first execution queue and the second execution queue include at least one common instruction.

In a particular embodiment, the first execution queue includes instructions associated with the first logical block, the second logical block, and the third logical block of instructions. The second execution queue may include instructions associated with the first logical block and the third logical block of instructions. For example the first execution queue may correspond to a conditional jump that is not taken, such as the execution queue 420, and the second execution queue may correspond to a conditional jump that is taken, such as the execution queue 410 depicted in FIG. 4.

Continuing to 816, the first execution queue and the second execution queue are evaluated to identify a hazard condition. Moving to 820, in a particular embodiment, the second execution queue is evaluated using a sliding window to apply hazard rules to instructions within the sliding window. The hazard rules may include data hazard rules and pipeline resource rules. By evaluating the second execution queue using the sliding window, hazards may be detected that may otherwise remain undetected, such as when the second execution queue corresponds to a conditional jump that is taken. The first execution queue may also be evaluated using a sliding window to apply hazard rules and pipeline resource rules. Proceeding to 822, the detected hazard conditions are reported.

Figure 9:
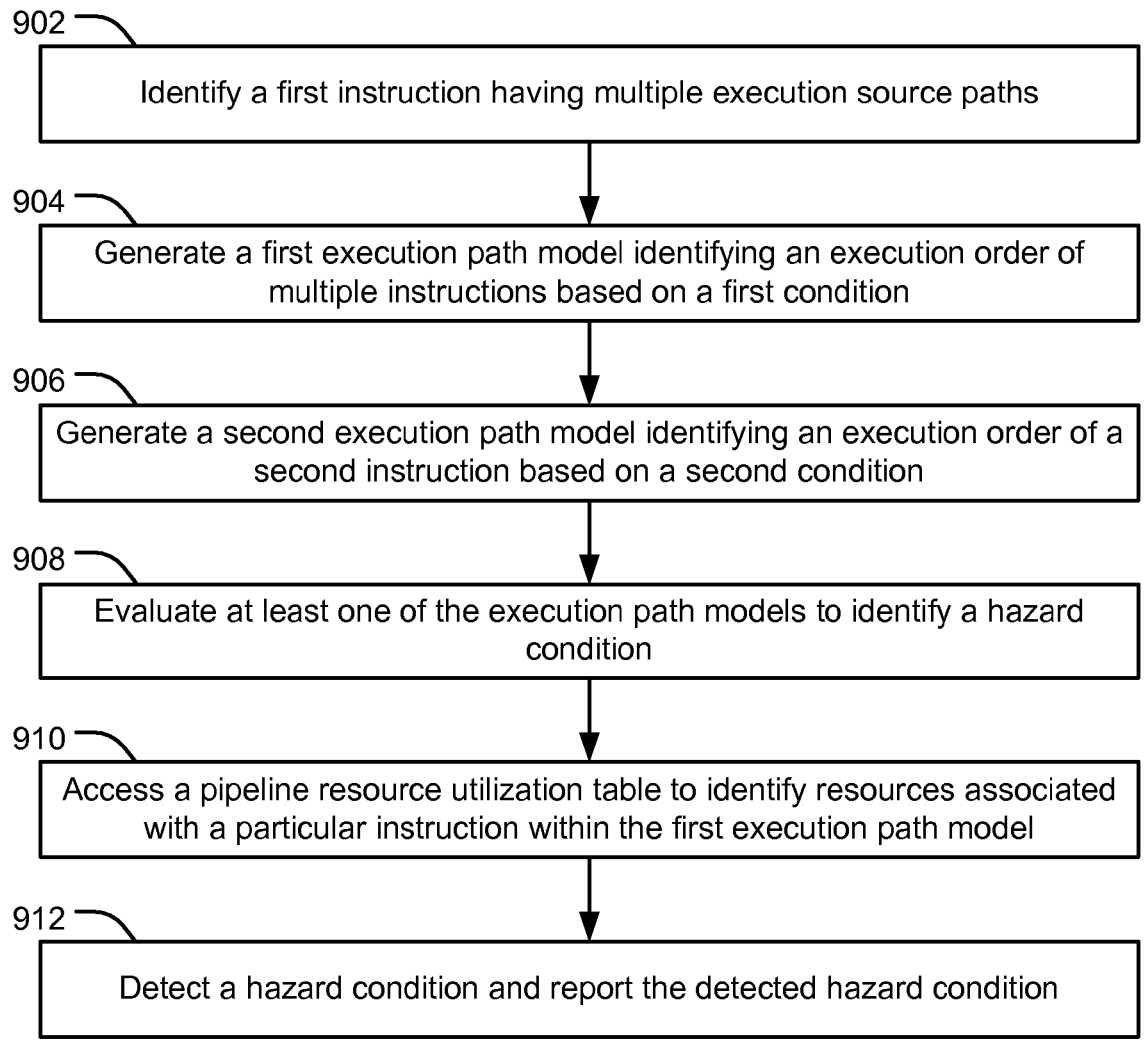
FIG. 9 is a flow chart of a second embodiment of a method to evaluate code.

Referring to FIG. 9, a flow chart of a second embodiment of a method to evaluate program code is depicted. The method may evaluate program code for a pipeline execution processor with in-order execution. In an illustrative embodiment, the method may be performed by the system 700 depicted in FIG. 7 in accordance with one or more of the embodiments depicted in FIGS. 1-6.

A first instruction having multiple execution source paths is identified, at 902. Moving to 904, a first execution path model identifying an execution order of multiple instructions based on a first condition is generated. Continuing to 906, a second execution path model identifying an execution order of a second instruction based on a second condition is generated. The first execution path model and the second execution path model may each include the first instruction.

In a particular embodiment, the first execution path model and the second execution path model are contained in different files. At least one of the files may include assembler assistance information associated with another of the files. The assembler assistance information may be used by an assembler to evaluate the execution path model.

Advancing to 908, at least one of the execution path models is evaluated to identify a hazard condition. Proceeding to 910, in a particular embodiment, a pipeline resource utilization table is accessed to identify resources associated with a particular instruction within the first execution path model. In a particular embodiment, the pipeline resource utilization table includes static predefined resource information associated with the particular instruction. In a particular embodiment, the pipeline resource utilization table also includes dynamic resource information associated with the particular instruction.

Moving to 912, a hazard condition is detected and the detected hazard condition is reported. In a particular embodiment, the hazard condition may be one or more of a data dependency hazard, a resource hazard, or a program flow hazard.

Those of skill will appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable read-only memory (EPROM), electrically erasable read-only memory (EEPROM), registers, hard disk, a removable disk, a compact-disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, the generic principles defined herein may be applied to other embodiments without departing from the scope of the disclosure. Accordingly, the disclosure and the figures are to be regarded as illustrative rather than restrictive. Thus, the present disclosure is not intended to be limited to the embodiments shown herein but is to be accorded the widest scope possible consistent with the principles and novel features as defined by the following claims.

What is claimed is:

1. A method of evaluating program code, the method comprising:
   identifying a first collection of ordered instructions that identifies an execution order of a first set of instructions based on a first condition, wherein the first collection of ordered instructions corresponds to a first execution path model;
   identifying a second collection of ordered instructions that identifies an execution order of a second set of instructions based on a second condition, wherein the second collection of ordered instructions corresponds to a second execution path model, wherein the first execution path model and the second execution path model are contained in different files, and wherein at least one of the tiles includes assembler assistance information that includes an assembler directive associated with another of the files;
   evaluating the first collection of ordered instructions and the second collection of ordered instructions to identify a hazard condition; and
   reporting the hazard condition.

2. The method of claim 1, wherein the first collection of ordered instructions and the second collection of ordered instructions include at least one common instruction.

3. The method of claim 2, further comprising:
   identifying a first logical block of instructions including a branch instruction;
   identifying a second logical block of instructions including the first set of instructions based on the first condition; and identifying a third logical block of instructions including the at least one common instruction, the at least one common instruction including a branch target of the branch instruction.

4. The method of claim 3, further comprising linking the first logical block to the third logical block, wherein the first collection of ordered instructions includes the first logical block, the second logical block, and the third logical block, and wherein the second collection of ordered instructions includes the first logical block and the third logical block.

5. The method of claim 1, further comprising evaluating the second collection of ordered instructions using a sliding window to apply hazard rules to instructions within the sliding window.

6. The method of claim 5, wherein the hazard rules include data hazard rules and pipeline resource rules.

7. The method of claim 1, wherein the first collection of ordered instructions and the second collection of ordered instructions are identified in response to a loop instruction or a conditional jump instruction.

8. The method of claim 1, further comprising using an in-order processor to identify the first collection of ordered instructions.

9. A method of evaluating program code, the method comprising:
identifying a first instruction having multiple execution source paths;
generating a first execution path model identifying an execution order of multiple instructions based on a first condition;
generating a second execution path model identifying an execution order of a second instruction based on a second condition, wherein the first execution path model and the second execution path model include the first instruction, wherein the first execution path model and the second execution path model are contained in different files, and wherein at least one of the files includes assembler assistance information that includes an assembler directive associated with another of the files; and
evaluating at least one of the execution path models to identify a hazard condition.

10. The method of claim 9, further comprising detecting the hazard condition and reporting the detected hazard condition.

11. The method of claim 9, wherein the hazard condition is one of a data dependency hazard, a resource hazard, and a program flow hazard.

12. The method of claim 9, further comprising:
accessing a pipeline resource utilization table to identify resources associated with a particular instruction within the first execution path model.

13. The method of claim 12, wherein the pipeline resource utilization table includes static resource information associated with the particular instruction.

14. The method of claim 12, wherein the pipeline resource utilization table includes dynamic resource information associated with the particular instruction.

15. The method of claim 9, wherein the assembler assistance information is used by an assembler to evaluate the execution path model.

16. The method of claim 9, wherein the assembler assistance information is used by an assembler to check an inter-instruction dependency between the files.

17. The method of claim 9, wherein the assembler directive includes a pragma definition used by an assembler to identify the hazard condition.

18. A system comprising:
a non-transitory memory medium to store program instructions;
modeling means for determining at least two parallel execution path models of the program instructions based on at least one conditional branching instruction of the program instructions, wherein the modeling means is configured to receive a first portion of the program instructions stored at a first file at the non-transitory memory medium, and wherein the modeling means is further configured to receive assembler assistance information including an assembler directive that is stored at the first file and that is associated with a second portion of the program instructions stored at a second file at the non-transitory memory medium;
evaluation means for identifying a hazard condition in at least one of the parallel execution path models; and
reporting means to report the hazard condition.

19. The system of claim 18, wherein the evaluation means includes a processor configured to populate a first collection of ordered instructions corresponding to a first of the parallel execution path models and a second collection of ordered instructions corresponding to a second of the parallel execution path models.

20. The system of claim 18, wherein the evaluation means includes a processor configured to evaluate multiple collections of ordered instructions to detect at least one of a data dependency hazard, a resource hazard, and a program flow hazard.

21. The system of claim 18, wherein at least one of the modeling means and the evaluation means includes circuitry configured to generate or evaluate the at least two parallel execution path models.

22. A non-transitory processor readable medium having operational instructions that are executable by a processor, the operational instructions comprising:
instructions to identify a conditional branch in a computer program, wherein the conditional branch is in a first file of program instructions;
instructions to evaluate a first execution path based on a first condition of the conditional branch and to evaluate a second execution path based on a second condition of the conditional branch to identify a hazard condition; and
instructions to report the hazard condition associated with either of the first execution path and the second execution path, wherein the instructions to report the hazard condition include instructions to generate a report of source code with line numbers, the report identifying a first error and a reason for the first error, and the report further identifying a second error associated with at least one instruction located at a second file.

23. The processor readable medium of claim 22, wherein the report indicates to insert instructions to delay execution of the computer program before jumping to execute a first instruction at the second file.

* * * * *